Feb. 14, 1956 P. H. J. BROUWER 2,735,028
LOW-POWER HUB DYNAMO
Filed Dec. 23, 1952
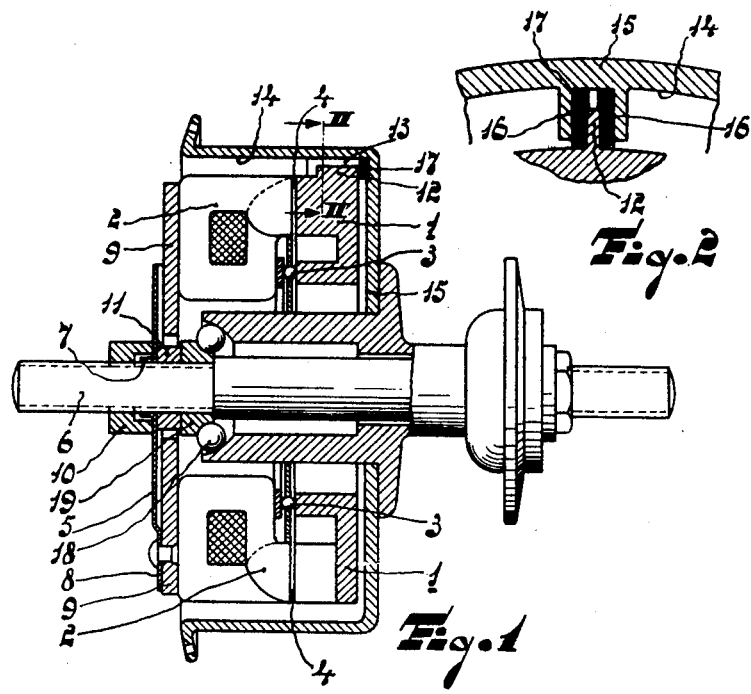
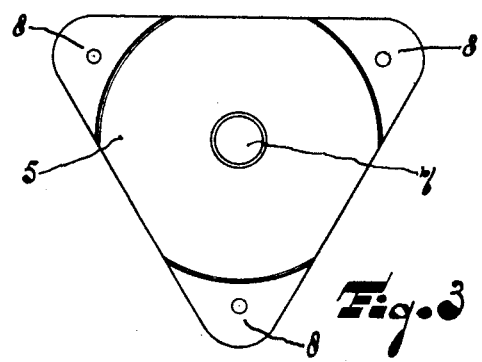
INVENTOR
PIETER HENDRIK JOHANNES BROUWER
BY Fred M. Vogel
AGENT United States Patent Office 2,735,028
Patented Feb. 14, 1956

2,735,028

LOW-POWER HUB DYNAMO

Pieter Hendrik Johannes Brouwer, Eindhoven, Netherlands, assignor to Hartford National Bank and Trust Company, Hartford, Conn., as trustee Application December 23, 1952, Serial No. 327,589

4 Claims. (Cl. 310—67)

This invention relates to improvements in low-power hub dynamos, and more particularly to hub-dynamos for use in bicycles.

This invention concerns an improvement in my invention described and claimed in co-pending application No. 232,743 to Pieter Hendrik Johannes Brouwer filed June 21, 1951, now Patent No. 2,658,157. In the said copending application, a rotary low-power machine is described, particularly a hub dynamo for a bicycle, having a magnetic circuit including two relatively rotatable parts arranged side by side in the axial direction, one of which is constituted by a multipolar permanent magnet. The parts are separated by spacing means which adjust the required width of the airgap provided between the parts and which in addition permit the relative rotation of the parts by rolling friction, one of the parts being arranged resiliently in the axial direction with respect to the machine component coupled to it. According to the above-identified application, the two parts of the magnetic circuit are each coupled to a separate member of the machine, said parts being also relatively rotatable but journalled rigidly in the axial direction. The means determining the position of said parts of the machine in the axial direction are subject to tolerance and this allows in several cases for divergences from the relative position of the machine members in the axial direction in component mounting. The relative position in the axial direction of the parts of the magnetic circuit may also show these divergences since the spacing means are also subject to tolerances. This results in that in component mounting that part of the magnetic circuit member which is arranged resiliently with respect to the machine member coupled thereto may be urged against the spacing means by a force which exceeds the magnetic attraction. When the tolerances of the means determining the position of the machine members in the axial direction turn out unfavourable, and said supplementary force, which is due to biasing in the resilient arrangement, may rise to a considerable value, so that the spacing means between the magnetic circuit parts are loaded unnecessarily and have to satisfy stringent requirements which would necessitate an expensive design. The same disadvantage may occur when the relative position in the axial direction of the machine members coupled to the magnetic circuit parts changes owing to wear of certain components of the machine.

The object of the invention is to provide means to obviate the above mentioned disadvantages, thus according to the invention, the magnetic circuit part not arranged resiliently in the axial direction with respect to the machine member coupled to it is journalled in the axial direction so as to be free to slide on the machine member coupled to it.

This ensures the advantage that the magnetic circuit part journalled so as to be free to slide is enabled to be adjusted without obstruction in the axial direction, so that the spacing means are loaded only by the magnetic attraction produced between the two parts of the magnetic circuit across the air-gap. The resilient arrangement of the one magnetic circuit part with respect to the machine member coupled to it is thus required to absorb wholly or in part only those additional forces which may be produced owing to the fact that the axes of the two magnetic circuit parts are at an angle different from 180° and which, in the absence of the resilient arrangement, would be required to be absorbed entirely by the spacing means. The above mentioned angle divergences may be due to inaccurate component mounting or to the fact that parts of the machine show themselves divergences or will show them after long use.

According to the preferred embodiment of the invention the magnet is journalled in the hub so as to be free to slide axially, whereas the remaining part of the circuit is coupled with the shaft of a machine by means of a member which is resilient axially and rigid tangentially.

The member may be constituted by a triangular and substantially flat plate having a central aperture, and the rim of which is secured to the machine shaft, and the corners of the plate being secured to the magnetic circuit part. This results in a simple and cheap construction which is axially resilient with respect to the machine. On the other hand, the plate is sufficiently rigid in the direction of rotation to ensure a fixed position in this direction with respect to the machine shaft. In one embodiment the magnet has its outer periphery provided with axial ribs engaging axial grooves provided on the inner periphery of the hub. Obviously, as an alternative, the ribs may be provided on the hub and the grooves on the magnet. A resilient substance such as rubber may be arranged tangentially between the ribs and the grooves, so that play between the ribs and the grooves is obviated and in addition less exacting requirements as to accurate positioning of said ribs and grooves are required to be satisfied in manufacturing. The magnet may be moved into the hub in a simple manner in the axial direction.

The invention will now be described with reference to the accompanying drawings given by way of example, in which:

Fig. 1 shows a vertical sectional view of a hub dynamo for bicycles according to the present invention.

Fig. 2 is a cross section taken along the line II—II of Fig. 1.

Fig. 3 is a front elevation view of a part of the hub dynamo shown in Fig. 1.

A multipolar permanent magnet 1 and the other part of a magnetic circuit consisting of a number of sheet-iron pole-pieces are separated by spacing or stop means in the shape of balls 3 which adjust the required width of an air-gap 4 and permit relative rotation of the magnet 1 and the sheet-iron pole-pieces 2. The pole-pieces 2 are secured to a shaft 6 of the hub dynamo by means of a triangular substantially flat plate 5. The plate 5 may be made of brass and its thickness is such that the plate is sufficiently resilient axially and is rigid tangentially. A central aperture 7 in the plate 5 is adapted to be placed over the shaft 6, the corners 8 being united with a sheet 9 of the sheet-iron pole-pieces 2. The plate 5 is secured tightly to a spacer 11 on the shaft 6 by means of a nut 10.

The magnet 1 comprises on its outer periphery axial ribs 12 which engage axial grooves 13 provided on the inner periphery 14 of a hub 15. Tangentially, the ribs 12 and the walls 16 of the grooves 13 are separated by rubber separating means 17.

The hub dynamo is fitted as follows. The magnet 1 is moved axially over the shaft 6 into the hub 15, then the ribs 12 are enveloped by the rubber strip 17 on three sides. When arranging the magnet 1 in the hub 15 the ribs 12 are made to engage the grooves 13. The magnet 1 is displaced axially until the ribs 12 engage with the hub via the rubber strip 17. Next, the sheet-iron pole-pieces 2 are mounted on the shaft 6 by tightening the nut 10. The magnet 1 is then adjusted by axial displacement under the action of magnetic attraction until the correct air-gap width has been adjusted by the balls 3.

Tolerances in the balls 3 with the associated running surfaces as well as in balls 18, ball race 19 and spacer 11 are released by the freedom of the magnet 1 to move axially and the plate 5 permits correction of the said divergences so that the magnet 1 tends to perform a rocking movement relative to the pole-pieces 2 during operation of the hub dynamo.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A low-power hub dynamo mounted on a shaft member and comprising at least two relatively rotatable parts arranged axially adjacent one another and one of said parts being a multipolar permanent magnet, stop means for maintaining at least a minimum predetermined air gap between said parts and permitting the relative rotation of said parts by rolling friction, said magnet being mounted in said hub for free axial movement with respect to its coupled member, and a member which is resilient axially and rigid tangentially for coupling said other part to said shaft.

2. A low-power hub dynamo mounted on a shaft member and comprising at least two relatively rotatable parts arranged axially adjacent one another and one of said parts being a multipolar permanent magnet, stop means for maintaining at least a minimum predetermined air gap between said parts and permitting the relative rotation of said parts by rolling friction, said magnet being mounted in said hub for free axial movement, and a triangular, substantially flat plate having a rimmed, central aperture therein, said flat plate being resilient axially and rigid tangentially with respect to its coupled member, the rim of said aperture being secured to said shaft and the corners of said plate being secured to said other part.

3. A low-power hub dynamo mounted on a shaft member and comprising at least two relatively rotatable parts arranged axially adjacent one another and one of said parts being a multipolar permanent magnet, stop means for maintaining at least a minimum predetermined air gap between said parts and permitting the relative rotation of said parts by rolling friction, axial grooves provided in the inner periphery of said hub, and axial ribs on the outer periphery of said magnet adapted to be inserted within said grooves thereby mounting said magnet for axial movement in said hub.

4. A low-power hub dynamo as claimed in claim 3 wherein a plurality of rubber elements are provided in said hub in order to separate said axial ribs and grooves.

References Cited in the file of this patent

UNITED STATES PATENTS

| | | |
|---|---|---|
| 504,914 | Eldredge | Sept. 12, 1893 |
| 515,216 | Gutmann | Feb. 20, 1894 |
| 614,608 | Cantono | Nov. 22, 1898 |
| 2,027,402 | Roach | Jan. 14, 1936 |